UNITED STATES PATENT OFFICE 2,305,570

CARDIOACTIVE DRUGS AND METHOD OF PREPARING THE SAME

Herman W. Dorn, Toledo, Ohio, assignor to Parker-Dorn, Inc., Worcester, Mass., a corporation of Massachusetts No Drawing. Application August 9, 1940, Serial No. 352,034

11 Claims. (Cl. 260—253)

This invention deals with cardio-active drugs and more particularly with cardio-active drugs obtained from squill, digitalis, strophanthus and the like. This group of cardio-active substances is recognized medically as a well-defined class, and the members of the group are believed to possess many similarities in chemical structure, although the plants in which they occur belong to several different families.

In this patent the term "cardio-active substances" will be used to refer to this class of compounds. The active principles of these drugs are believed as a result of chemical investigations to be related to the sterols, and they occur combined with sugars in the form of glucosides. Their properties indicate that they contain lactone rings possessing peculiar degrees of unsaturation.

One object of the invention is to provide a cardio-active drug of reduced toxicity. Another object of this invention is to provide a cardio-active substance which will in addition to its cardiac action produce a vaso-dilating action which is coordinated with its cardiac action both in time, intensity and locality. Another object of my invention is to provide a cardio-active substance of improved stability and capable of better standardization than is practicable with the cardio-active preparations heretofore available.

The cardiac action of the above mentioned class of drugs is well known and need not be described in detail here. In general it may be said that the administration of the drug slows the heart and increases the power of its strokes. Unfortunately this action is accompanied by a constricting action on blood vessels, especially in the heart muscle, and a consequent decrease of coronary flow, causing what is known as angina pectoris. Because of these toxic effects, drugs of this class must ordinarily be administered in extremely small quantities.

The simultaneous administration of a vaso dilator and of a heretofore known cardio-active drug would not satisfactorily control these toxic effects because it would be difficult if not impossible to have the dilating action take place at the same time as the cardiac action, to have it take place chiefly in the heart muscle, and to adjust the intensity of the dilating action to the intensity of the cardiac action. The body's elimination of the two drugs would, moreover, proceed at different rates.

By the present invention it is possible to produce a new drug which combines in a single substance cardio-active and vaso-dilating properties and which is therefore a cardio-active drug of reduced toxicity. Hence this drug may be administered in somewhat larger doses and a more effective cardiac action may be obtained.

In addition to the above advantages these new substances have improved stability and solubility, which aid in the standardization of doses. At present the drugs vary in strength both with time and origin. This improved solubility is somewhat surprising because while in the past it was thought necessary to prevent the sugar nuclei from being split off the glucoside nucleus by hydrolysis in order to maintain solubility and physiological activity, the preparation of the new compounds begins with a treatment that splits off all the sugar nuclei of the original glucoside.

The preparation of the drugs of this invention consists in general of the preparation of an alkali metal derivative of the cardio-active material (which derivative is believed to be a new substance of valuable properties), the preparation of a halogen derivative of a vaso-dilating substance, such as dimethyl or trimethyl-xanthine, and then the reaction of the cardio-active derivative and the vaso-dilator derivative, forming the new drug together with a quantity of alkali metal halide.

The details of the preparation according to this invention of the improved cardio-active substances which are the subject of the invention will now be described. Although this preparation of improved drugs is applicable to all cardio-active glucosides of the class described above, the use of squill glucoside, which hydrolyses somewhat more readily than the other cardio-active glucosides, is preferred.

The first step of the preparation consists in the preparation of an alkali metal derivative of the original cardio-active material. The starting material is a purified cardio-active glucoside, such as purified squill glucoside. The purification of the cardio-active glucosides is well known and may be accomplished by any of a number of methods. The glucoside consists of one or more sugar nuclei chemically combined with a cardio-active nucleus sometimes called an "aglucone" or a "genin." The glucoside is dissolved in distilled water and a dilute solution, for example of about one-tenth normal concentration, of an alkali metal hydroxide, for instance sodium hydroxide, is added in an amount sufficient to bring the pH of the solution to about 9.5. The mixture is then evaporated to dryness under reduced pressure. Orange crystals appear which possess greater solubility than the original glucoside. In the course of this treatment the sugar nuclei of the glucoside are freed from the cardio-active substance. The sugars formed may be separated by a suitable extraction or they may be left mixed with the cardio-active substance, with the activity of which they do not interfere. The cardio-active substance is transformed by this treatment into an alkali metal derivative, for analysis reveals that alkali metal atoms have been combined with the organic nucleus. It is believed that in the case of the sodium derivative of squill two atoms of sodium are combined with each molecule of "aglucone" or "genin." This "aglucone" or "genin" in the case of squill is believed to contain 24 carbon atoms. The invention does not of course depend on the accuracy of these observations concerning chemical composition.

These alkali metal derivatives of the cardio-active substance comprise a new class of substances with valuable properties. They are more soluble and stable than the original glucosides. They are also reactive and make possible further modification of physiological properties by reactions with other substances to form new compounds. One such reaction constitutes the last major step of the preparation of the drugs which are the subject of the present invention, but before this step is described the preparation of the other reagent will be set forth.

In order to prepare the substance which upon combination with the cardio-active derivative will impart vaso-dilational properties, a substance possessing the property of vaso-dilation such as dimethyl or trimethyl-xanthine is first treated to form a halogen derivative. In the case of tri-methyl-xanthine, sometimes known as caffeine, this may readily be accomplished by treating with chlorine in anhydrous chloroform. The chlorine is passed into the chloroform solution through a fine bored nozzle. The temperature is kept at about 10° C. The solution is allowed to set and then is evaporated to dryness. This produces 8-chloro-trimethyl-xanthine, sometimes known as 8-chloro-caffeine.

Other methods of chlorination may also be used: for instance, anhydrous trimethyl-xanthine may be heated with phosphorus pentachloride to about 160° C., the product then being recrystallized from chloroform.

The corresponding chlorine derative of theophylline (theophylline is 1-3-dimethyl-xanthine) may be prepared directly from caffeine (trimethyl-xanthine) by chlorination with phosphorus oxychloride and chlorine, which attacks the 7-methyl group as well as the 8 position. Treatment with boiling water will split off the substituted methyl group and 8-chloro-theophylline (8-chloro-1-3-dimethyl-xanthine) will be obtained.

The next step in the production of a cardio-active drugs which are the subject of this invention is the coupling of the vaso-dilator group or groups with the cardio-active nucleus, which can be accomplished by reacting the alkali metal derivative of the cardio-active genin with the halogen derivative of the vaso-dilatational substance. This may be carried out as in the following example:

Five grams of 8-chloro-trimethyl-xanthine are added to an aqueous solution of four grams of the above described sodium derivative of the genin obtained from squill. The mixture is stirred well at 30° C. for twenty-five minutes. On evaporating the solution to dryness and then dissolving the residue in alcohol and then evaporating the alcohol, yellow crystals are obtained having a melting point of 224-226° C. One part of this drug dissolves in 40 parts of water, thus exhibiting greater solubility than the original squill glucosides. The anhydrous drug takes up two molecules of water upon standing exposed to the atmosphere or upon solution in and recrystallization from water.

The sodium and chlorine are eliminated, insofar as the reaction is complete, from the organic materials by the formation of salt. This may be removed by extraction, but such removal may be and usually is unnecessary for physiological applications. Analysis of the drug formed in the above example gives results indicating that there are two trimethyl-xanthine nuclei and one squill genin nucleus in each molecule. The compound is laevorotatory.

Like the cardio-active substances heretofore known, substances of this type give color effects when tested with acetic anhydride and sulfuric acid. The above described compound prepared from squill genin, like squill bodies, gives the particular color test known as the Liebermann cholesterol reaction. Unlike the cardio-active substances heretofore known, these substances also reveal the presence of vaso-dilator group by the following reaction: 0.2 g. of the drug is powdered and boiled gently in a small porcelain dish with freshly prepared chlorine water, then evaporated to dryness on the water-bath; the yellow residue is moistened with ammonium hydroxide solution and warmed cautiously; a positive purplish-red color being formed indicating the presence of the vaso-dilator group.

The corresponding dimethylxanthine derivative of squill genin, prepared in the above manner from the sodium derivative of the genin and 8-chloro-1-3-dimethylxanthine, also dissolves in 40 parts of water and takes up two molecules of water of crystallization. Likewise it appears to contain two dimethylxanthine nuclei and one squill genin nucleus in each molecule. It melts at about 251° C., but begins to decompose at about 248° C.

The presence of the dilator group may be revealed by a purple-red color obtained on warming with ammonium hydroxide after the drug has been powdered, boiled gently with nitric acid and evaporated to dryness on a water-bath.

The physiological effects of the drugs the preparation of which has just been described are unique. Not only is the characteristic slowing of the heart common to the cardio-active glucosides and their derivatives observed, but the toxicity of the drug and its tendency to reduce coronary flow are greatly reduced. The dilation of the blood vessels in the heart muscle also enables better nutrition of the heart muscle while the drug takes effect. The vaso-dilating effect is localized in the area where the cardio-active effect takes place: the cardio-active substance tends to accumulate in the heat tissue, and since this new substance also has a vaso-dilating effect, the latter effect is likewise concentrated in the heart region, producing a new result not before attained with any vaso-dilator. Since only one drug is administered, the bodily processes of elimination reduce the cardiac effect and the vaso-dilator effect at about the same rate. And because of the reduced toxicity and improved blood flow accompanying the use of this drug, larger and more effective doses may safely be administered. The improved solubility makes the drug active and easy to handle. The drug is also relatively stable and is more readily standardized than any cardio-active preparation now on the market.

The drugs may be produced with different types of vaso-dilator action, or even with different amounts of vaso-dilator action. This is achieved by selecting some particular vaso-dilator group. Although dimethylxanthine and trimethylxanthine, for instance, both possess vaso-dilatational properties, these substances differ somewhat in the particular nature of their physiological effects. Hence various modifications of the new combined cardiac and dilatational effect produced by the drugs of the present invention may be obtained by the selection of various vaso-dilator substances in the preparation of the drugs.

The relative intensity and cardiac effect may be further adjusted by determining the number of vaso-dilator nuclei in the drug molecule. The illustrations given above described drugs in which there are two xanthine nuclei in each molecule.

By suitable chemical processes, however, the number of xanthine nuclei in each drug molecule can be varied. For instance, a compound containing four vaso-dilator groups combined with one cardio-active nucleus may be prepared in the following manner:

3.7 grams of the 1,3 dimethylxanthine derivative of squill genin described above are added to a solution of 6.0 grams of 1,3 dimethylxanthine in 20.0 grams of ethylene diamine. A thick yellow syrup is formed. Apparently, in this compound the ethylene diamine serves to bind two additional xanthine groups to the xanthine groups already attached to the squill genin molecule. A similar compound can be prepared containing trimethylxanthine groups instead of dimethylxanthine groups.

In the claims the term xanthine group is used to include trimethylxanthine, dimethylxanthine and similar vaso-dilator groups.

I claim:

1. A cardio-active substance comprising a cardio-active nucleus selected from the group which consists of squill, digitalis and strophanthus and at least one xanthine nucleus united in chemical combination and possessing both cardiac activity and vaso-dilating action.

2. A cardio-active substance comprising a cardio-active genin group chemically combined with at least one xanthine group.

3. A cardio-active substance containing in chemical combination a cardio-active squill genin group and at least one xanthine group and possessing both cardiac activity and vaso-dilating action.

4. A cardio-active substance comprising at least one xanthine group chemically combined directly with a cardio-active genin group and at least one other xanthine group combined with the rest of the molecule by means of an ethylene diamine group, and possessing both cardiac activity and vaso-dilator action.

5. The method of making cardio-active substances possessing vaso-dilator action and reduced toxicity which consists in treating in aqueous solution a cardio-active substance containing a cardio-active genin group with an alkali metal hydroxide to form an alkali metal derivative free from combined sugar and reacting said derivative with a halogen-substituted and methyl-substituted xanthine having vaso-dilating properties, thereby producing a chemical compound comprising both cardio-active and xanthine groups.

6. The method of making cardio-active substances possessing vaso-dilator action and reduced toxicity which consists in treating in aqueous solution a cardio-active substance containing a cardio-active genin group with an alkali metal hydroxide to form an alkal metal derivative and reacting said derivative with a halogen-substituted xanthine, thereby producing a compound comprising both cardio-active and xanthine groups.

7. The method of making cardio-active squill derivatives possessing vaso-dilator action and reduced toxicity which consists in treating the cardio-active principle of squill bulbs with an alkali metal hydroxide in aqueous solution to form an alkali metal derivative and reacting said derivative with a halogen-substituted and methyl-substituted xanthine, thereby obtaining a chemical combination of cardio-active and xanthine groups.

8. The method of making cardio-active squill derivatives possessing vaso-dilator action and reduced toxicity which consists of treating the cardio-active principle of squill bulbs with an alkali metal hydroxide in aqueous solution at a pH less than 13, drying the alkali metal derivative formed by said treatment, and reacting said alkali metal derivative with a halogen-substituted vaso-dilator-xanthine, thereby producing a chemical compound comprising both cardio-active and xanthine groups.

9. The method of making cardio-active substances possessing vaso-dilator action and reduced toxicity which consists in treating a substance containing a cardio-active genin group with the hydroxide of an alkali metal in aqueous solution to form an alkali metal derivative, reacting said derivative with a halogen-substituted vaso-dilator xanthine, thereby producing a chemical combination of cardio-active and xanthine groups, treating the product of said reaction with a vaso-dilator xanthine in ethylene diamine solution, thereby obtaining a combination of additional xanthine groups with the cardio-active molecule.

10. A cardio-active substance comprising a cardio-active genin group chemically combined with two xanthine groups and possessing both cardiac activity and vaso-dilating action.

11. A cardio-active substance comprising a cardio-active genin group chemically combined with at least one methyl-substituted xanthine group and possessing both cardiac activity and vaso-dilating action.

HERMAN W. DORN.